(12) United States Patent
Wang et al.

(10) Patent No.: US 9,692,697 B2
(45) Date of Patent: Jun. 27, 2017

(54) CONTROL CHANNEL ESTABLISHING METHOD, FORWARDING POINT, AND CONTROLLER

(71) Applicant: Huawei Technologies Co., Ltd., Shenzhen (CN)

(72) Inventors: Jun Wang, Beijing (CN); Tao Bai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 14/792,294

(22) Filed: Jul. 6, 2015

(65) Prior Publication Data
US 2015/0304218 A1    Oct. 22, 2015

Related U.S. Application Data

(63) Continuation of application No. PCT/CN2013/081875, filed on Aug. 20, 2013.

(30) Foreign Application Priority Data

Jan. 6, 2013    (CN) .......................... 2013 1 0003163

(51) Int. Cl.
  *H04L 12/28* (2006.01)
  *H04L 12/741* (2013.01)
  (Continued)

(52) U.S. Cl.
  CPC .......... *H04L 45/74* (2013.01); *H04L 12/4641* (2013.01); *H04L 12/66* (2013.01);
  (Continued)

(58) Field of Classification Search
  CPC ....................................................... H04L 12/24
  (Continued)

(56) References Cited

U.S. PATENT DOCUMENTS

2010/0020722 A1    1/2010    Farkas et al.
2010/0278076 A1   11/2010    Reddy et al.
(Continued)

FOREIGN PATENT DOCUMENTS

CN    101304333 A    11/2008
CN    101414963 A     4/2009
(Continued)

OTHER PUBLICATIONS

Sharma, S. et al., "Enabling Fast Failure Recovery in OpenFlow Networks," 2011 8th International Workshop on the Design of Reliable Communication Networks (DRCN), 2011, 8 pages.

*Primary Examiner* — Farah Faroul
(74) *Attorney, Agent, or Firm* — Slater Matsil, LLP

(57) ABSTRACT

A control channel establishing method, a forwarding point, and controller. The method includes sending, by a first Forwarding Point (FP), topology information of the first FP to a second FP by using a Link Layer Discovery Protocol (LLDP), receiving, by the first FP, first routing information that is sent by the controller and is used by the first FP to reach the controller, where the first routing information is generated by the controller according to the topology information of the first FP, and establishing, by the first FP, a second control channel with the controller according to the first routing information.

13 Claims, 6 Drawing Sheets

A first FP sends topology information of the first FP to a second FP by using the LLDP, so that the second FP sends, after receiving the topology information of the first FP, the topology information of the first FP to a controller through a first control channel, where the first control channel is pre-established between the second FP and the controller — 101

The first FP receives first routing information that is sent by the controller and is used by the first FP to reach the controller, where the first routing information is generated by the controller according to the topology information of the first FP — 102

The first FP establishes a second control channel with the controller according to the first routing information — 103

(51) Int. Cl.
    *H04L 12/46*     (2006.01)
    *H04L 12/66*     (2006.01)
    *H04L 12/24*     (2006.01)
    *H04L 12/751*    (2013.01)
    *H04L 12/715*    (2013.01)
    *H04L 12/707*    (2013.01)
    *H04L 12/703*    (2013.01)
    *H04L 12/717*    (2013.01)

(52) U.S. Cl.
    CPC .......... *H04L 41/0813* (2013.01); *H04L 41/12* (2013.01); *H04L 45/02* (2013.01); *H04L 45/22* (2013.01); *H04L 45/28* (2013.01); *H04L 45/42* (2013.01); *H04L 45/64* (2013.01); *Y02B 60/43* (2013.01)

(58) Field of Classification Search
    USPC .......................................................... 370/254
    See application file for complete search history.

(56) References Cited

U.S. PATENT DOCUMENTS

| | | | | |
|---|---|---|---|---|
| 2011/0314517 A1* | 12/2011 | Yamato | ..................... | H04L 9/32 726/3 |
| 2011/0317701 A1* | 12/2011 | Yamato | ................... | H04L 45/04 370/392 |
| 2012/0113989 A1* | 5/2012 | Akiyoshi | ................ | H04L 45/02 370/392 |
| 2013/0003745 A1 | 1/2013 | Nishimura | | |
| 2013/0250958 A1* | 9/2013 | Watanabe | ................ | H04L 45/54 370/392 |
| 2014/0036726 A1* | 2/2014 | Kusumoto | .............. | H04L 45/12 370/254 |
| 2014/0247751 A1* | 9/2014 | Sonoda | ................ | H04L 41/5064 370/254 |
| 2016/0021028 A1* | 1/2016 | Koide | ..................... | H04L 41/12 370/400 |
| 2017/0019337 A1* | 1/2017 | Fujinami | ............. | H04L 12/6418 |

FOREIGN PATENT DOCUMENTS

| | | |
|---|---|---|
| CN | 101667956 A | 3/2010 |
| CN | 102137017 A | 7/2011 |
| CN | 102792645 A | 11/2012 |
| CN | 103067277 A | 4/2013 |
| EP | 2095569 A1 | 9/2009 |
| EP | 1593287 B1 | 10/2012 |
| EP | 2608459 A2 | 6/2013 |
| WO | 2008076052 A1 | 6/2008 |
| WO | 2011113394 A2 | 9/2011 |
| WO | 2012101692 A1 | 8/2012 |

* cited by examiner

CONTROL CHANNEL ESTABLISHING METHOD, FORWARDING POINT, AND CONTROLLER

This application is a continuation of International Application No. PCT/CN2013/081875, filed on Aug. 20, 2013, which claims priority to Chinese Patent Application No. 201310003163.0, filed on Jan. 6, 2013, both of which are hereby incorporated by reference in their entireties.

TECHNICAL FIELD

The present invention relates to communications technologies, and in particular, to a control channel establishing method, a forwarding point, and a controller.

BACKGROUND

A virtual cluster system consists of a controller (Controller) and a Forwarding Point (FP), where the controller is configured to perform centralized control on the FP in the virtual cluster system; the FP is configured to externally forward a packet of a virtual cluster; and a control channel needs to be established between the controller and the FP to perform internal packet transmission of the virtual cluster. In the prior art, a routing connection is established between a controller and an FP by using the Interior Gateway Protocol (IGP), and the FP establishes a control channel with the controller by using the routing connection. Because there may be multiple FPs in a virtual cluster, an IGP neighbor relationship needs to be separately established between FPs, and between an FP and the controller. In this case, each FP in the virtual cluster needs to maintain multiple IGP neighbor relationships, and each FP needs to store routing information for reaching another FP in the virtual cluster. An FP needs to maintain an IGP neighbor relationship with an FP in a virtual cluster or a controller in the virtual cluster all the time, which, as a result, increases load of a Central Processing Unit (CPU) of the FP, degrades forwarding performance of the FP, and is adverse to development of the virtual cluster technology.

SUMMARY

Embodiments of the present invention provide a control channel establishing method, a forwarding point, and a controller, which help to avoid a problem in the prior art that FP forwarding performance degrades due to establishment of a control channel between an FP in a virtual cluster and a controller in the virtual cluster by using the IGP.

According to a first aspect, a control channel establishing method is provided, where the method is applicable to a virtual cluster system; the virtual cluster system includes a first FP, a second FP, and a controller; a Link Layer Discovery Protocol (LLDP) neighbor relationship is established between the first FP and the second FP; and the method includes:

sending, by the first FP by using the LLDP, topology information of the first FP to the second FP, so that the second FP sends, after receiving the topology information of the first FP, the topology information of the first FP to the controller through a first control channel, where the first control channel is pre-established between the second FP and the controller;

receiving, by the first FP, first routing information that is sent by the controller and is used by the first FP to reach the controller, where the first routing information is generated by the controller according to the topology information of the first FP; and establishing, by the first FP, a second control channel with the controller according to the first routing information.

In a first possible implementation manner of the first aspect, the virtual cluster system further includes a third FP; an LLDP neighbor relationship is established between the third FP and the first FP; and after the establishing a second control channel with the controller according to the first routing information, the method further includes:

receiving, by the first FP, topology information of the third FP that is sent by the third FP by using the LLDP, and sending, by the first FP, the topology information of the third FP to the controller through the second control channel, so that the controller generates, according to the topology information of the third FP, second routing information that is used by the third FP to reach the controller; and receiving, by the first FP through the second control channel, the second routing information sent by the controller, and sending the second routing information to the third FP, so that the third FP establishes a third control channel with the controller according to the second routing information.

In the first aspect or the first possible implementation manner of the first aspect, a second possible implementation manner of the first aspect is further provided, and that the first control channel is pre-established between the second FP and the controller is specifically:

establishing, by the second FP and in a static routing manner or a Generic Routing Encapsulation GRE tunnel manner, the first control channel with the controller.

In the first aspect or any one of the foregoing possible implementation manners of the first aspect, the method further includes:

establishing, by the first FP, a label switched path (Label Switched Path, LSP) with the controller according to the first routing information.

According to a second aspect, a control channel establishing method is provided, where the method is applicable to a virtual cluster system; the virtual cluster system includes a first FP, a second FP, and a controller; an LLDP neighbor relationship is established between the first FP and the second FP; and the method includes:

receiving, by the controller, topology information of the first FP that is sent by the second FP through a first control channel, where the topology information of the first FP is received by the second FP from the first FP by using the LLDP, and the first control channel is pre-established between the controller and the second FP;

generating, by the controller according to the topology information of the first FP, first routing information that is used by the first FP to reach the controller; and sending, by the controller, the first routing information to the first FP through the second FP, so that the first FP establishes, after receiving the first routing information, a second control channel with the controller according to the first routing information.

In a first possible implementation manner of the second aspect, the method further includes the following:

The virtual cluster system further includes a third FP; after the first FP establishes, after receiving the first routing information, a second control channel with the controller according to the first routing information, the method further includes:

receiving, by the controller, topology information of the third FP that is sent by the first FP through the second channel, where the topology information of the third FP is received by the first FP from the third FP by using the LLDP, and the first control channel is pre-established between the controller and the second FP;

generating, by the controller according to the topology information of the third FP, second routing information that is used by the third FP to reach the controller; and sending, by the controller, the second routing information to the third FP through the first FP, so that the third FP establishes, after receiving the second routing information, the second control channel with the controller according to the second routing information.

In the second aspect or the first possible implementation manner of the second aspect, a second possible implementation manner of the second aspect is further provided, and that the first control channel is pre-established between the second FP and the controller is specifically:

establishing, by the second FP and in a static routing manner or a Generic Routing Encapsulation (GRE) tunnel manner, the first control channel with the controller.

In the second aspect or any one of the foregoing possible implementation manners of the second aspect, a third possible implementation manner of the second aspect is further provided, and the first FP establishes, after receiving the first routing information, an LSP with the controller according to the first routing information.

According to a third aspect, a first FP is provided, where the first FP is applicable to a virtual cluster system; the virtual cluster system includes the first FP, a second FP, and a controller; an LLDP neighbor relationship is established between the first FP and the second FP; and the first FP includes:

a sending unit, configured to send, by using the LLDP, topology information of the first FP to the second FP, so that the second FP sends, after receiving the topology information of the first FP, the topology information of the first FP to the controller through a first control channel, where the first control channel is pre-established between the second FP and the controller;

a receiving unit, configured to receive first routing information that is sent by the controller and is used by the first FP to reach the controller, where the first routing information is generated by the controller according to the topology information of the first FP; and a processing unit, configured to establish a second control channel with the controller according to the first routing information received by the receiving unit.

In a first possible implementation manner of the third aspect, the virtual cluster system further includes a third FP; an LLDP neighbor relationship is established between the third FP and the first FP; and after the establishing a second control channel with the controller according to the first routing information, the receiving unit is further configured to receive topology information of the third FP that is sent by the third FP by using the LLDP;

the sending unit is further configured to send, to the controller and through the second control channel, topology information of the third FP that is received by the receiving unit, so that the controller generates, according to the topology information of the third FP, second routing information that is used by the third FP to reach the controller;

the receiving unit is further configured to receive, through the second control channel, the second routing information sent by the controller; and the sending unit is further configured to send the second routing information received by the receiving unit to the third FP, so that the third FP establishes a third control channel with the controller according to the second routing information.

In the third aspect or the first possible implementation manner of the third aspect, a second possible implementation manner of the third aspect is further provided, and the processing unit is further configured to establish an LSP with the controller according to the first routing information.

According to a fourth aspect, a controller is provided, where the controller is applicable to a virtual cluster system; the virtual cluster system includes a first FP, a second FP, and the controller; an LLDP neighbor relationship is established between the first FP and the second FP; and the controller includes:

a receiving unit, configured to receive topology information of the first FP that is sent by the second FP through a first control channel, where the topology information of the first FP is received by the second FP from the first FP by using the LLDP, and the first control channel is pre-established between the controller and the second FP;

a processing unit, configured to generate, according to the topology information of the first FP that is received by the receiving unit, first routing information that is used by the first FP to reach the controller; and a sending unit, configured to send the first routing information that is generated by the processing unit to the first FP through the second FP, so that the first FP establishes, after receiving the first routing information, a second control channel with the controller according to the first routing information.

In a first possible implementation manner of the fourth aspect, the virtual cluster system further includes a third FP; an LLDP neighbor relationship is established between the third FP and the first FP; and after the first FP establishes, after receiving the first routing information, a second control channel with the controller according to the first routing information, the receiving unit is further configured to receive topology information of the third FP that is sent by the first FP through the second control channel, where the topology information of the third FP is received by the first FP from the third FP by using the LLDP; and the first control channel is pre-established between the controller and the second FP;

the processing unit is further configured to generate, according to the topology information of the third FP, second routing information that is used by the third FP to reach the controller; and the sending unit is further configured to send the second routing information to the third FP through the first FP, so that the third FP establishes, after receiving the second routing information, the second control channel with the controller according to the second routing information.

In conclusion, by using the technical solutions provided by the embodiments of the present invention, the first FP sends, by using the LLDP, the topology information of the first FP to the second FP that has established the first control channel with the controller; the second FP sends the topology information of the first FP to the controller; the controller delivers the first routing information according to the topology information of the first FP; and the first FP establishes the second control channel with the controller according to the first routing information.

In this technical solution to control channel establishing, the first FP does not need to run the IGP protocol, which avoids that the first FP maintains an IGP neighbor relationship; moreover, the first FP does not need to store routing information for reaching another FP in a virtual cluster, which helps save storage resources of the first FP and helps improve forwarding performance of the first FP.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A controller involved in the present invention is a controller that complies with separation of control and forwarding in a network architecture. A forwarding point involved in the present invention is a forwarding point that complies with separation of controlling and forwarding in a network architecture. The forwarding point processes a received packet according to a flow table. The controller controls the forwarding point through a control channel.

For example, when forwarding a packet, the forwarding point may forward a Layer 2 packet, and may also forward a Layer 3 packet. For details on Layer 2 and Layer 3, reference may be made to an open systems interconnection model (Open Systems Interconnection model, OSI model).

In a specific implementation, the forwarding point may be a switch or a router.

In a scenario in which the forwarding point is a switch, the forwarding point may be specifically an OpenFlow switch (OpenFlow Switch). For an OpenFlow switch, reference may be made to the OpenFlow Switch Specification version 1.0 (OpenFlow Switch Specification 1.0) released by the standard setting organization (Standard Setting Organization, SSO) Open Networking Foundation (Open Networking Foundation, ONF).

In a specific implementation, the controller may be an OpenFlow controller (OpenFlow Controller). For an OpenFlow controller, reference may be made to the OpenFlow Switch Specification version 1.0 released by the ONF.

In specific implementation for establishing, the control channel may be a secure channel (Secure Channel) through which an OpenFlow switch interacts with an OpenFlow controller. For a secure channel, reference may be made to the OpenFlow Switch Specification version 1.0 released by the ONF.

Figure 1:
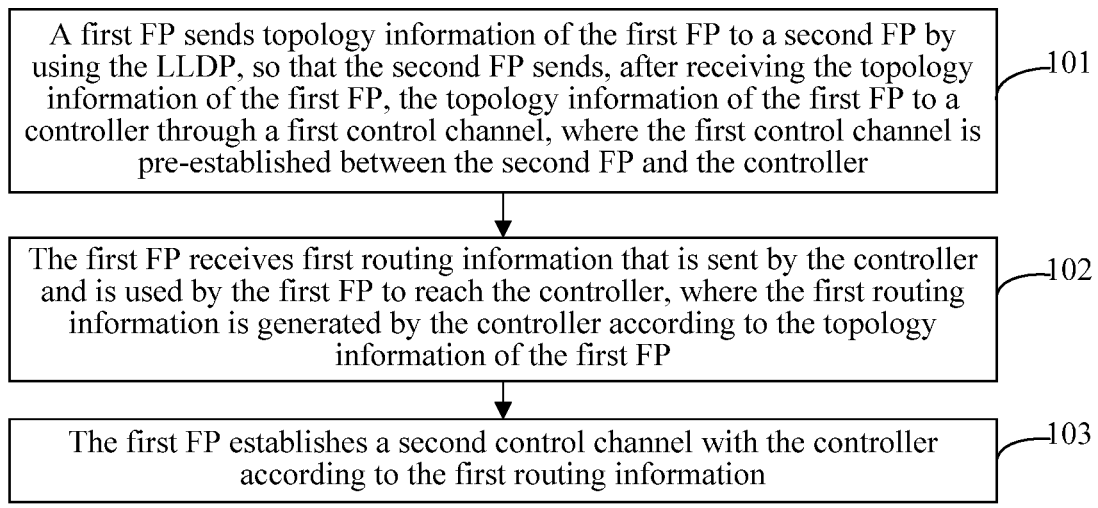
FIG. 1 is a schematic flowchart of a control channel establishing method according to an embodiment of the present invention.

Referring to FIG. 1, an embodiment of the present invention provides a control channel establishing method, where the method is applicable to a virtual cluster system; the virtual cluster system includes a first FP, a second FP, and a controller; an LLDP neighbor relationship is established between the first FP and the second FP; and the method includes the following content.

101. The first FP sends, by using the LLDP, topology information of the first FP to the second FP, so that the second FP sends, after receiving the topology information of the first FP, the topology information of the first FP to the controller through a first control channel, where the first control channel is pre-established between the second FP and the controller.

Optionally, that the first control channel is pre-established between the second FP and the controller is specifically:

The second FP establishes, in a static routing manner or a Generic Routing Encapsulation (Generic Routing Encapsulation, GRE) tunnel manner, the first control channel with the controller.

102. The first FP receives first routing information that is sent by the controller and is used by the first FP to reach the controller, where the first routing information is generated by the controller according to the topology information of the first FP.

The controller generates, according to the topology information of the first FP, routing information that is used by the controller to reach the first FP and the first routing information that is used by the first FP to reach the controller, and the controller only needs to send the first routing information to the first FP.

103. The first FP establishes a second control channel with the controller according to the first routing information.

The first routing information includes information about a path through which the first FP reaches the controller, and the first FP may establish, after receiving the first routing information, the second control channel with the controller.

Optionally, the first routing information may include: primary routing information and alternate routing information. Accordingly, the second control channel established between the first FP and the controller includes: an active control channel and a standby control channel, where the active control channel is established based on the primary routing information, and the standby control channel is established based on the alternate routing information.

Under normal circumstances, the active control channel is in a working state; the standby control channel is in an idle state; and if the active control channel is faulty, the standby control channel is switched to be a new active control channel. The first FP configures Bidirectional Forwarding Detection (BFD) protocol detection for the primary routing information, and after the BFD detects that the primary routing information is faulty, the state of the standby control channel is switched over to a working state, that is, the standby control channel is switched to be a new active control channel.

It can be seen that, the first FP sends, by using the LLDP, the topology information of the first FP to the second FP; the second FP sends the topology information of the first FP to the controller; the first FP does not need to run an IGP protocol, thereby avoiding that the first FP maintains an IGP neighbor relationship; moreover, the first FP does not need to store routing information for reaching another FP in a virtual cluster, which helps save storage resources of the first FP and helps improve forwarding performance of the first FP.

According to the foregoing technical solution, the first FP completes establishing the control channel between the first FP and the controller by using another FP, that is, the second FP. Likewise, after completing establishing the control channel, the first FP may also assist another FP in establishing a control channel.

Figure 2:
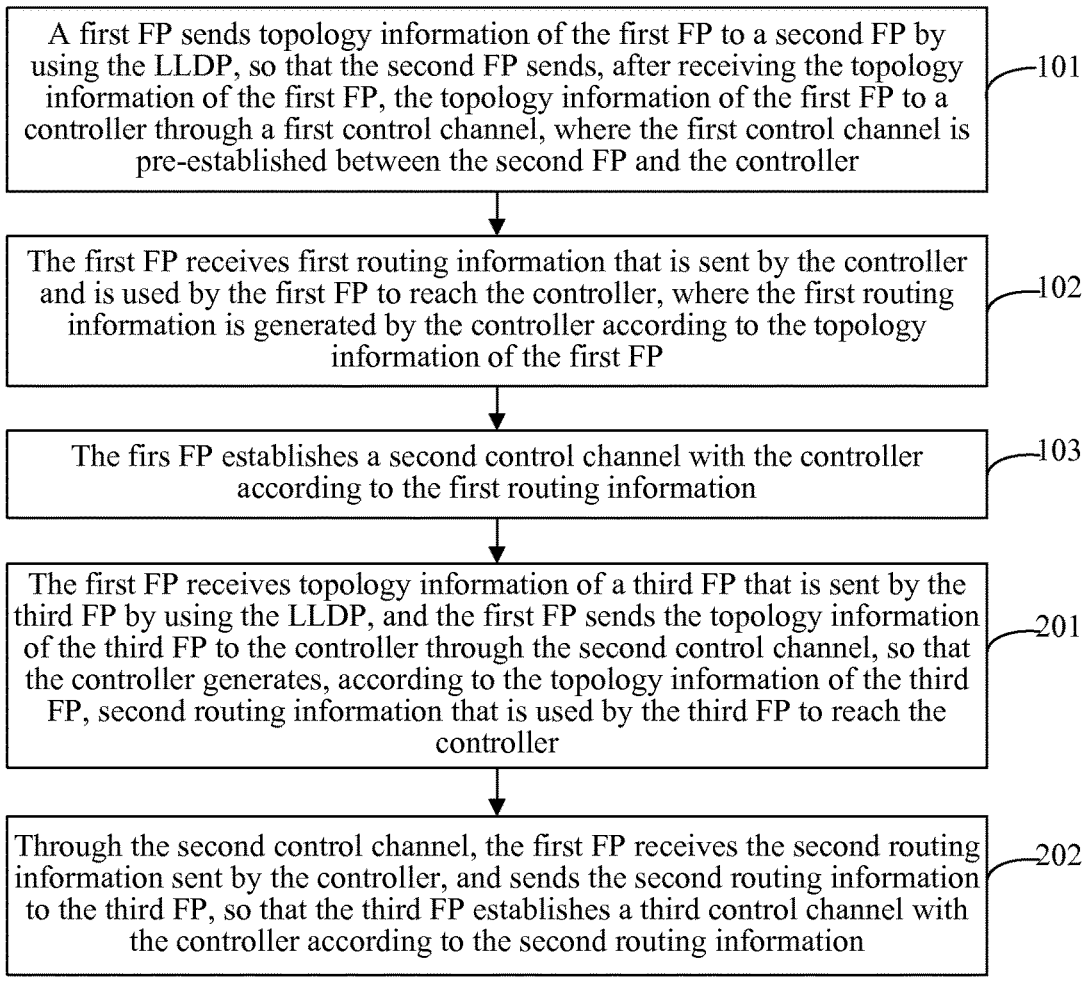
FIG. 2 is a schematic flowchart of another control channel establishing method according to an embodiment of the present invention.

Optionally, the virtual cluster system further includes a third FP, and an LLDP neighbor relationship is established between the third FP and the first FP. Referring to FIG. 2, the method may further include:

201. The first FP receives topology information of the third FP that is sent by the third FP by using the LLDP, and the first FP sends the topology information of the third FP to the controller through the second control channel, so that the controller generates, according to the topology information of the third FP, second routing information that is used by the third FP to reach the controller;

202. Through the second control channel, the first FP receives the second routing information sent by the controller, and sends the second routing information to the third FP, so that the third FP establishes a third control channel with the controller according to the second routing information.

Optionally, the first FP establishes an LSP with the controller by using the first routing information.

Optionally, the second control channel between the first FP and the controller may further be established according to the LSP.

Optionally, the LSP may further include an active LSP and a standby LSP, and the second control channel established between the first FP and the controller includes: an active control channel and a standby control channel, where the active control channel is established based on the active LSP and the standby control channel is established based on the standby LSP. Under normal circumstances, the active control channel is in a working state; the standby control channel is in an idle state; and if the active control channel is faulty, the standby control channel is switched to be a new active control channel. The first FP configures BFD detection for the active LSP, and after the BFD detects that the active LSP is faulty, the state of the standby control channel is switched over to a working state, that is, the standby control channel is switched to be a new active control channel.

Figure 3:
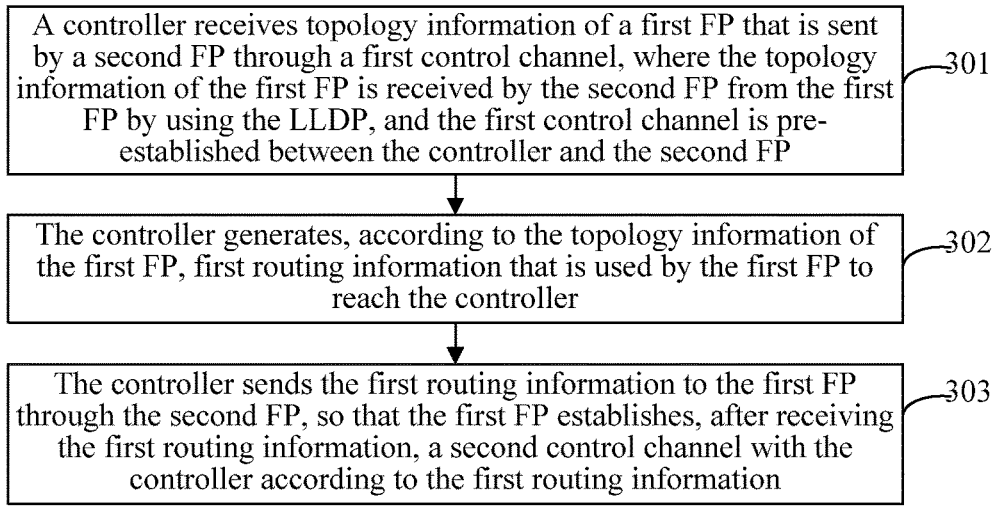
FIG. 3 is a schematic flowchart of another control channel establishing method according to an embodiment of the present invention.

Referring to FIG. 3, an embodiment of the present invention provides a control channel establishing method, where the method is applicable to a virtual cluster system; the virtual cluster system includes a first forwarding point FP, a second FP, and a controller; an LLDP neighbor relationship is established between the first FP and the second FP; and the method includes:

301. The controller receives topology information of the first FP that is sent by the second FP through a first control channel, where the topology information of the first FP is received by the second FP from the first FP by using the LLDP, and the first control channel is pre-established between the controller and the second FP.

Optionally, that the first control channel is pre-established between the second FP and the controller is specifically:

The second FP establishes, in a static routing manner or a GRE tunnel manner, the first control channel with the controller.

302. The controller generates, according to the topology information of the first FP, first routing information that is used by the first FP to reach the controller.

The controller generates, according to the topology information of the first FP, routing information that is used by the controller to reach the first FP and the first routing information that is used by the first FP to reach the controller, and the controller only needs to send the first routing information to the first FP.

303. The controller sends the first routing information to the first FP through the second FP, so that the first FP establishes, after receiving the first routing information, a second control channel with the controller according to the first routing information.

Figure 4:
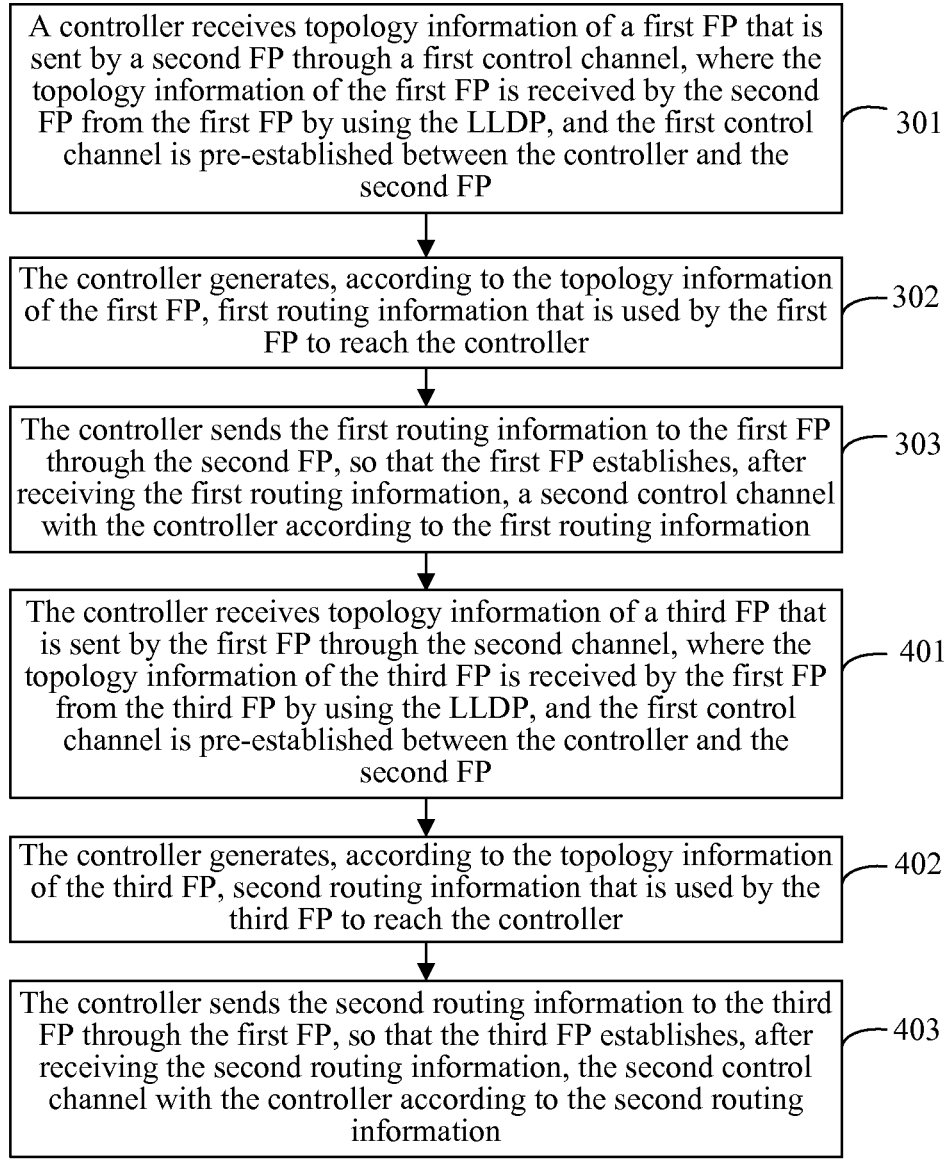
FIG. 4 is a schematic flowchart of another control channel establishing method according to an embodiment of the present invention.

Optionally, the virtual cluster system further includes a third FP; an LLDP neighbor relationship is established between the third FP and the first FP; and after the first FP establishes, after receiving the first routing information, a second control channel with the controller according to the first routing information, referring to FIG. 4, the method further includes:

401. The controller receives topology information of the third FP that is sent by the first FP through the second channel, where the topology information of the third FP is received by the first FP from the third FP by using the LLDP, and the first control channel is pre-established between the controller and the second FP.

402. The controller generates, according to the topology information of the third FP, second routing information that is used by the third FP to reach the controller.

403. The controller sends the second routing information to the third FP through the first FP, so that the third FP establishes, after receiving the second routing information, the second control channel with the controller according to the second routing information.

Optionally, the first FP establishes, after receiving the first routing information, an LSP with the controller according to the first routing information.

Optionally, the second control channel between the first FP and the controller may further be established according to the LSP.

The first FP sends, by using the LLDP, the topology information of the first FP to the second FP; the second FP sends the topology information of the first FP to the controller; the first FP does not need to run an IGP protocol, thereby avoiding that the first FP maintains an IGP neighbor relationship; moreover, the first FP does not need to store routing information for reaching another FP in a virtual cluster, which helps save storage resources of the first FP and helps improve forwarding performance of the first FP.

Figure 5:
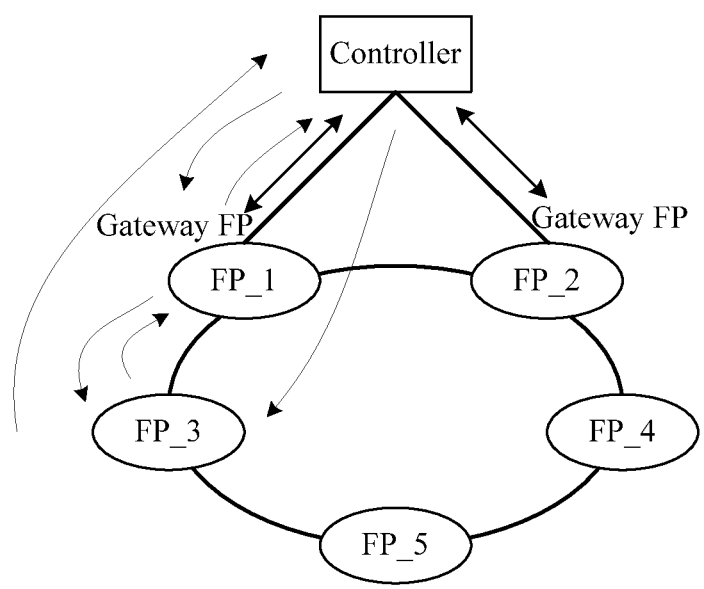
FIG. 5 is a schematic structural diagram of a virtual cluster system according to an embodiment of the present invention.
Figure 6:
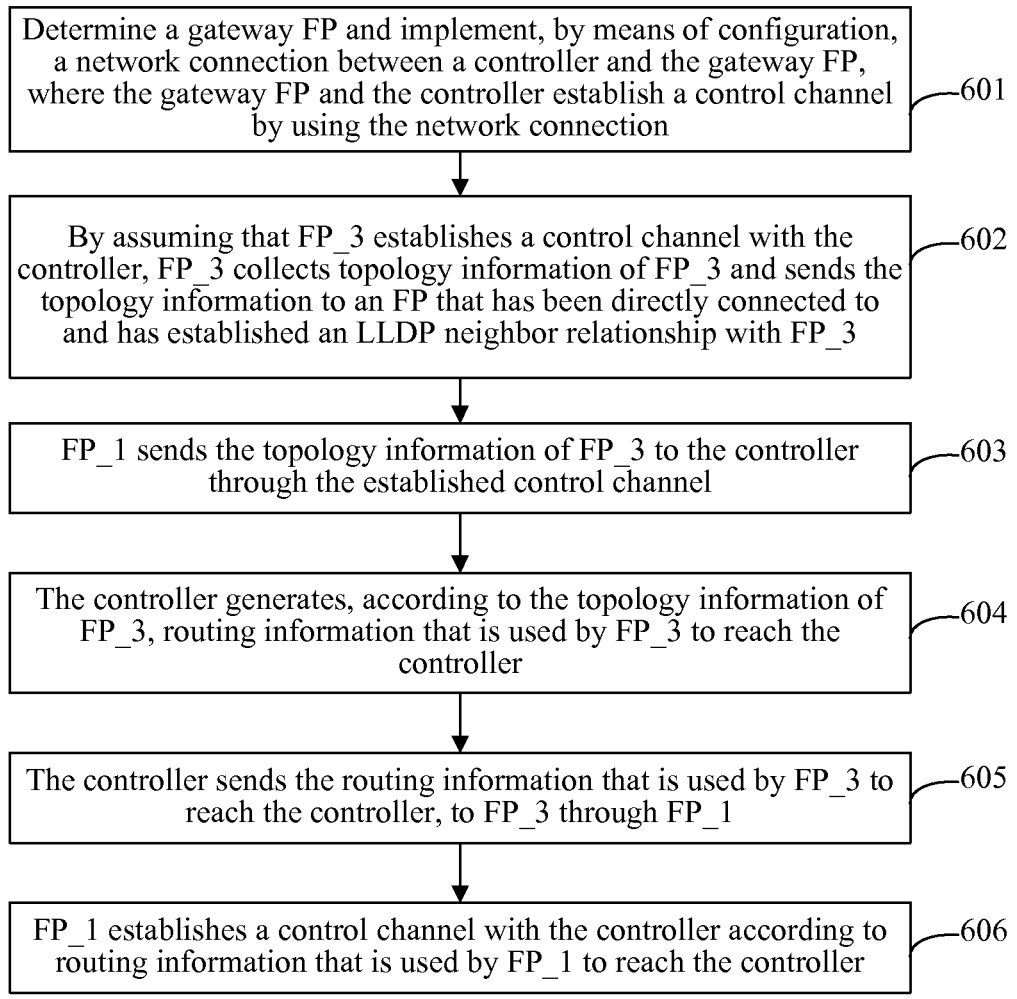
FIG. 6 is a schematic flowchart of another control channel establishing method according to an embodiment of the present invention.

Referring to FIG. 5, an embodiment of the present invention provides a virtual cluster system, where the virtual cluster system includes a controller and FPs, and the FPs are FP_1, FP_2, FP_3, FP_4, and FP_5 separately. With reference to the system provided in FIG. 5, and referring to FIG. 6, another embodiment is provided.

601. Determine a gateway FP and implement, by means of configuration, a network connection between a controller and the gateway FP, where the gateway FP and the controller establish a control channel by using the network connection.

One or more FPs may be selected as the gateway FP; the gateway FP is directly connected to the controller, or is connected to the controller by using a network. Optionally, the network connection between the controller and the gateway FP is established in a static routing manner or a GRE manner.

Referring to FIG. 5, that FP_1 and FP_2 serve as the gateway FP is used as an example.

602. By assuming that FP_3 establishes a control channel with the controller, FP_3 collects topology information of FP_3 and sends the topology information to an FP that has been directly connected to and has established an LLDP neighbor relationship with FP_3. In this embodiment, FP_3 may send the topology information of FP_3 to FP_1 or FP_5.

603. The FP_1 sends the topology information of FP_3 to the controller through the established control channel.

The LLDP protocol may be configured on an FP in a virtual cluster to implement collection and reporting of topology information.

In addition, an FP that does not have routing information for reaching the controller, such as FP_5, may discard, after receiving the topology information sent by FP_3, the topology information.

604. The controller generates, according to the topology information of FP_3, routing information that is used by FP_3 to reach the controller.

605. The controller sends, to FP_3 and by using FP_1, the routing information that is used by FP_3 to reach the controller.

606. The FP_1 establishes a control channel with the controller according to routing information that is used by FP_1 to reach the controller.

Figure 7:
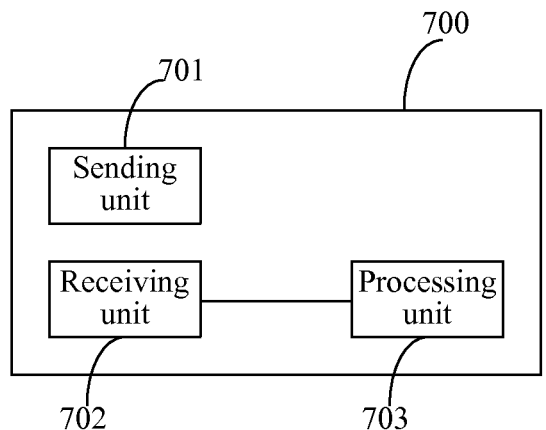
FIG. 7 is a schematic structural diagram of a first FP according to an embodiment of the present invention.

Referring to FIG. 7, an embodiment of the present invention provides a first FP 700, where the first FP 700 is applicable to a virtual cluster system; the virtual cluster system includes the first FP 700, a second FP, and a controller; an LLDP neighbor relationship is established between the first FP 700 and the second FP; and the first FP 700 includes:

a sending unit 701, configured to send, by using the LLDP, topology information of the first FP 700 to the second FP, so that the second FP sends, after receiving the topology information of the first FP 700, the topology information of the first FP 700 to the controller through a first control channel, where the first control channel is pre-established between the second FP and the controller;

a receiving unit 702, configured to receive first routing information that is sent by the controller and is used by the first FP 700 to reach the controller, where the first routing information is generated by the controller according to the topology information of the first FP 700; and a processing unit 703, configured to establish a second control channel with the controller according to the first routing information received by the receiving unit 702.

Optionally, that the first control channel is pre-established between the second FP and the controller is specifically:

The second FP establishes, in a static routing manner or a GRE tunnel manner, the first control channel with the controller.

The controller generates, according to the topology information of the first FP 700, routing information that is used by the controller to reach the first FP 700 and the first routing information that is used by the first FP 700 to reach the controller, and the controller only needs to send the first routing information to the first FP 700.

Optionally, the virtual cluster system further includes a third FP; an LLDP neighbor relationship is established between the third FP and the first FP 700; and after the establishing a second control channel with the controller according to the first routing information, the first FP 700 further includes the following:

The receiving unit 702 is further configured to receive topology information of the third FP that is sent by the third FP by using the LLDP.

The sending unit 701 is further configured to send, to the controller and through the second control channel, topology information of the third FP that is received by the receiving unit 702, so that the controller generates, according to the topology information of the third FP, second routing information that is used by the third FP to reach the controller.

The receiving unit 702 is further configured to receive, through the second control channel, the second routing information sent by the controller.

The sending unit 701 is further configured to send the second routing information received by the receiving unit 702 to the third FP, so that the third FP establishes a third control channel with the controller according to the second routing information.

Optionally, the processing unit 703 is further configured to establish an LSP with the controller by using the first routing information.

It can be seen that, the first FP 700 sends, by using the LLDP, the topology information of the first FP 700 to the second FP; the second FP sends the topology information of the first FP 700 to the controller; the first FP 700 does not need to run an IGP protocol, thereby avoiding that the first FP 700 maintains an IGP neighbor relationship; moreover, the first FP 700 does not need to store routing information for reaching another FP in a virtual cluster, which helps save storage resources of the first FP 700 and helps improve forwarding performance of the first FP 700.

Figure 8:
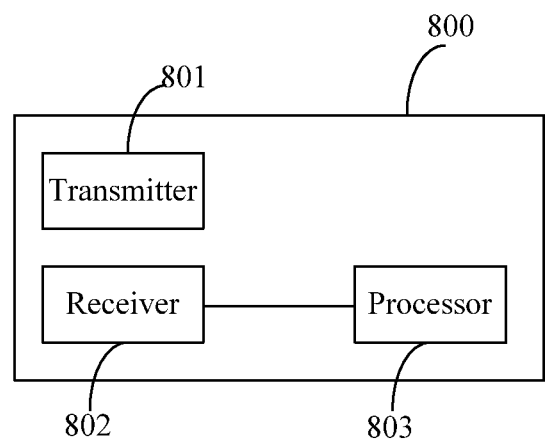
FIG. 8 is a schematic structural diagram of another first FP according to an embodiment of the present invention.

Referring to FIG. 8, an embodiment of the present invention provides a first FP 800, where the first FP 800 is applicable to a virtual cluster system; the virtual cluster system includes the first FP 800, a second FP, and a controller; an LLDP neighbor relationship is established between the first FP 800 and the second FP; and the first FP 800 includes:

a transmitter 801, configured to send, by using the LLDP, topology information of the first FP 800 to the second FP, so that the second FP sends, after receiving the topology information of the first FP 800, the topology information of the first FP 800 to the controller through a first control channel, where the first control channel is pre-established between the second FP and the controller;

a receiver 802, configured to receive first routing information that is sent by the controller and is used by the first FP 800 to reach the controller, where the first routing information is generated by the controller according to the topology information of the first FP 800; and a processor 803, configured to establish a second control channel with the controller according to the first routing information that is received by the receiver 802.

Optionally, that the first control channel is pre-established between the second FP and the controller is specifically:

The second FP establishes, in a static routing manner or a GRE tunnel manner, the first control channel with the controller.

The controller generates, according to the topology information of the first FP 800, routing information that is used by the controller to reach the first FP 800 and the first routing information that is used by the first FP 800 to reach the controller, and the controller only needs to send the first routing information to the first FP 800.

Optionally, the virtual cluster system further includes a third FP; an LLDP neighbor relationship is established between the third FP and the first FP 800; and after the establishing a second control channel with the controller according to the first routing information, the first FP 800 further includes the following:

The receiver 802 is further configured to receive topology information of the third FP that is sent by the third FP by using the LLDP.

The transmitter 801 is further configured to send, to the controller and through the second control channel, topology information of the third FP that is received by the receiver 802, so that the controller generates, according to the topology information of the third FP, second routing information that is used by the third FP to reach the controller.

The receiver 802 is further configured to receive, through the second control channel, the second routing information sent by the controller.

The transmitter 801 is further configured to send the second routing information received by the receiver 802 to the third FP, so that the third FP establishes a third control channel with the controller according to the second routing information.

Optionally, the processor 803 is further configured to establish an LSP with the controller by using the first routing information.

It can be seen that, the first FP 800 sends, by using the LLDP, the topology information of the first FP 800 to the second FP; the second FP sends the topology information of the first FP 800 to the controller; the first FP 800 does not need to run an IGP protocol, thereby avoiding that the first FP 800 maintains an IGP neighbor relationship; moreover, the first FP 800 does not need to store routing information for reaching another FP in a virtual cluster, which helps save storage resources of the first FP 800 and helps improve forwarding performance of the first FP 800.

Figure 9:
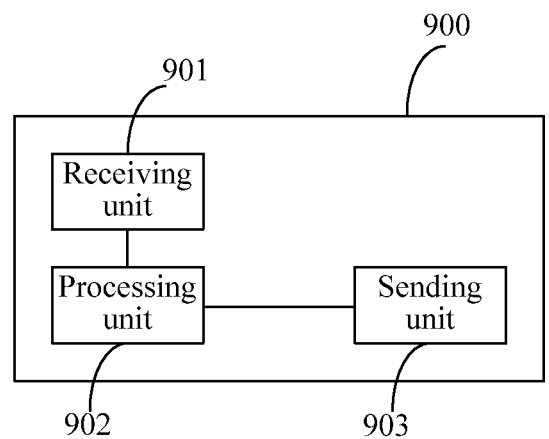
FIG. 9 is a schematic structural diagram of a controller according to an embodiment of the present invention.

Referring to FIG. 9, an embodiment of the present invention provides a controller 900, where the controller 900 is applicable to a virtual cluster system; the virtual cluster system includes a first FP, a second FP, and the controller 900; an LLDP neighbor relationship is established between the first FP and the second FP; and the controller 900 includes:

a receiving unit 901, configured to receive topology information of the first FP that is sent by the second FP through a first control channel, where the topology information of the first FP is received by the second FP from the first FP by using the LLDP, and the first control channel is pre-established between the controller and the second FP;

a processing unit 902, configured to generate, according to the topology information of the first FP that is received by the receiving unit 901, first routing information that is used by the first FP to reach the controller; and a sending unit 903, configured to send the first routing information that is generated by the processing unit 902 to the first FP through the second FP, so that the first FP establishes, after receiving the first routing information, a second control channel with the controller according to the first routing information.

Optionally, the virtual cluster system further includes a third FP; an LLDP neighbor relationship is established between the third FP and the first FP; and after the first FP establishes, after receiving the first routing information, a second control channel with the controller according to the first routing information, the controller 900 further includes the following:

The receiving unit 901 is further configured to receive topology information of the third FP that is sent by the first FP through the second control channel, where the topology information of the third FP is received by the first FP from the third FP by using the LLDP, and the first control channel is pre-established between the controller and the second FP.

The processing unit 902 is further configured to generate, according to the topology information of the third FP, second routing information that is used by the third FP to reach the controller.

The sending unit 903 is further configured to send the second routing information to the third FP through the first FP, so that the third FP establishes, after receiving the second routing information, the second control channel with the controller according to the second routing information.

Optionally, that the first control channel is pre-established between the second FP and the controller is specifically:

The second FP establishes, in a static routing manner or a GRE tunnel manner, the first control channel with the controller.

The controller generates, according to the topology information of the first FP, routing information that is used by the controller to reach the first FP and the first routing information that is used by the first FP to reach the controller, and the controller only needs to send the first routing information to the first FP.

Optionally, the first FP establishes, after receiving the first routing information, an LSP with the controller according to the first routing information.

Optionally, the second control channel between the first FP and the controller may further be established according to the LSP.

The first FP establishes the LLDP neighbor relationship with the second FP to which the first FP is directly connected; the second FP sends the topology information of the first FP to the controller 900; the first FP does not need to run an IGP protocol, thereby avoiding that the first FP maintains an IGP neighbor relationship; moreover, the first FP does not need to store routing information for reaching another FP in a virtual cluster, which helps save storage resources of the first FP and helps improve forwarding performance of the first FP.

Figure 10:
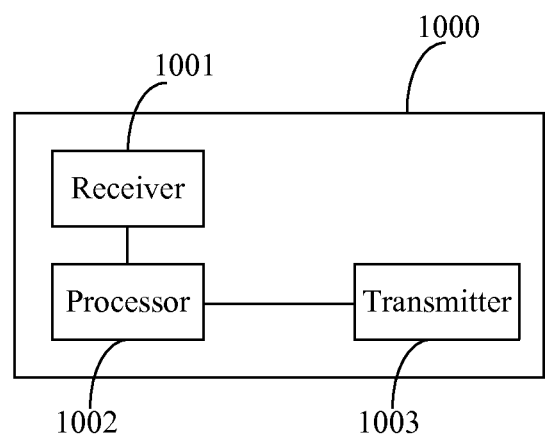
FIG. 10 is a schematic structural diagram of another controller according to an embodiment of the present invention.

Referring to FIG. 10, an embodiment of the present invention provides a controller 1000, where the controller 1000 is applicable to a virtual cluster system; the virtual cluster system includes a first forwarding point FP, a second FP, and the controller 1000; an LLDP neighbor relationship is established between the first FP and the second FP; and the controller 1000 includes:

a receiver 1001, configured to receive topology information of the first FP that is sent by the second FP through a first control channel, where the topology information of the first FP is received by the second FP from the first FP by using the LLDP, and the first control channel is pre-established between the controller and the second FP;

a processor 1002, configured to generate, according to the topology information of the first FP that is received by the receiver 1001, first routing information that is used by the first FP to reach the controller; and a transmitter 1003, configured to send the first routing information that is generated by the processor 1002 to the first FP through the second FP, so that the first FP establishes, after receiving the first routing information, a second control channel with the controller according to the first routing information.

Optionally, the virtual cluster system further includes a third FP; an LLDP neighbor relationship is established between the third FP and the first FP; and after the first FP establishes, after receiving the first routing information, a second control channel with the controller according to the first routing information, the controller 1000 further includes the following:

The receiver 1001 is further configured to receive topology information of the third FP that is sent by the first FP through the second control channel, where the topology information of the third FP is received by the first FP from the third FP by using the LLDP, and the first control channel is pre-established between the controller and the second FP.

The processor 1002 is further configured to generate, according to the topology information of the third FP, second routing information that is used by the third FP to reach the controller.

The transmitter 1003 is further configured to send the second routing information to the third FP through the first FP, so that the third FP establishes, after receiving the second routing information, the second control channel with the controller according to the second routing information.

Optionally, that the first control channel is pre-established between the second FP and the controller is specifically:

The second FP establishes, in a static routing manner or a GRE tunnel manner, the first control channel with the controller.

The controller generates, according to the topology information of the first FP, routing information that is used by the controller to reach the first FP and the first routing information that is used by the first FP to reach the controller, and the controller only needs to send the first routing information to the first FP.

Optionally, the first FP establishes, after receiving the first routing information, an LSP with the controller according to the first routing information.

Optionally, the second control channel between the first FP and the controller may further be established according to the LSP.

The first FP establishes the LLDP neighbor relationship with the second FP to which the first FP is directly connected; the second FP sends the topology information of the first FP to the controller 1000; the first FP does not need to run an IGP protocol, thereby avoiding that the first FP maintains an IGP neighbor relationship; moreover, the first FP does not need to store routing information for reaching another FP in a virtual cluster, which helps save storage resources of the first FP and helps improve forwarding performance of the first FP.

The foregoing processor 803 and processor 1002 may be a general purpose processor, a digital signal processor (DSP), an application-specific integrated circuit (ASIC), a field programmable gate array (FPGA) or another programmable logic device, a discrete gate or transistor logic device, or a discrete hardware assembly. The general purpose processor may be a microprocessor or any conventional processor.

In addition, the first FP700, the first FP800, the controller 900 or the controller 1000 may further include a memory, and the memory may be a mature storage medium in the art, such as a random access memory, a flash memory, a read-only memory, a programmable read-only memory, an electrically erasable programmable memory, or a register. In addition, they may further include a bus system, and the bus system includes a data bus, a power supply bus, a control bus, a status signal bus, or the like.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed method, device, and system may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A control channel establishing method, wherein the method is applicable to a virtual cluster system, wherein the virtual cluster system comprises a first forwarding point (FP), a second FP, and a controller, and wherein a first Link Layer Discovery Protocol (LLDP) neighbor relationship is established between the first FP and the second FP, the method comprising:

sending, by the first FP, topology information of the first FP to the second FP by using the first LLDP neighbor relationship, wherein the second FP sends, after receiving the topology information of the first FP, the topology information of the first FP to the controller through a first control channel, wherein the first control channel is pre-established between the second FP and the controller;

receiving, by the first FP, first routing information that is sent by the controller and is used by the first FP to reach the controller, wherein the first routing information is generated by the controller according to the topology information of the first FP; and establishing, by the first FP, a second control channel with the controller according to the first routing information.

2. The method according to claim 1, wherein the virtual cluster system further comprises a third FP;

wherein a second LLDP neighbor relationship is established between the third FP and the first FP; and wherein the method further comprises:

receiving, by the first FP and after the establishing the second control channel with the controller according to the first routing information, topology information of the third FP that is sent by the third FP by using the second LLDP neighbor relationship;

sending, by the first FP, the topology information of the third FP to the controller through the second control channel, wherein the controller generates, according to the topology information of the third FP, second routing information that is used by the third FP to reach the controller;

receiving, by the first FP through the second control channel, the second routing information sent by the controller; and sending, by the first FP, the second routing information to the third FP, wherein the third FP establishes a third control channel with the controller according to the second routing information.

3. The method according to claim 1, wherein that the first control channel is pre-established between the second FP and the controller by establishing, by the second FP, the first control channel with the controller in a static routing manner or a Generic Routing Encapsulation (GRE) tunnel manner.

4. The method according to claim 1, further comprising:
establishing, by the first FP, a label switched path (LSP) with the controller according to the first routing information.

5. A control channel establishing method, wherein the method is applicable to a virtual cluster system, wherein the virtual cluster system comprises a first forwarding point (FP), a second FP, and a controller, and wherein a first Link Layer Discovery Protocol (LLDP) neighbor relationship is established between the first FP and the second FP, the method comprising:

receiving, by the controller, topology information of the first FP that is sent by the second FP through a first control channel, wherein the topology information of the first FP is received by the second FP from the first FP by using the first LLDP neighbor relationship, and wherein the first control channel is pre-established between the controller and the second FP;

generating, by the controller according to the topology information of the first FP, first routing information that is used by the first FP to reach the controller; and sending, by the controller, the first routing information to the first FP through the second FP, wherein the first FP establishes, after receiving the first routing information, a second control channel with the controller according to the first routing information.

6. The method according to claim 5, wherein the virtual cluster system further comprises a third FP;

wherein a second LLDP neighbor relationship is established between the third FP and the first FP; and wherein the method further comprises:

receiving, by the controller and after the first FP establishes the second control channel with the controller according to the first routing information after receiving the first routing information, topology information of the third FP that is sent by the first FP through the second channel, wherein the topology information of the third FP is received by the first FP from the third FP by using the second LLDP neighbor relationship, and wherein the first control channel is pre-established between the controller and the second FP;

generating, by the controller according to the topology information of the third FP, second routing information that is used by the third FP to reach the controller; and sending, by the controller, the second routing information to the third FP through the first FP, wherein the third FP establishes, after receiving the second routing information, the second control channel with the controller according to the second routing information.

7. The method according to claim 5, wherein that the first control channel is pre-established between the controller and the second FP by establishing, by the second FP, the first control channel with the controller in a static routing manner or a Generic Routing Encapsulation (GRE) tunnel manner.

8. The method according to claim 5, further comprising:
establishing, by the first FP and after receiving the first routing information, a label switched path (LSP) with the controller according to the first routing information.

9. A first forwarding point (FP), wherein the first FP is applicable to a virtual cluster system comprising the first FP, a second FP, and a controller, wherein a first Link Layer Discovery Protocol (LLDP) neighbor relationship is established between the first FP and the second FP, the first FP comprising:

a transmitter configured to send topology information of the first FP to the second FP by using the first LLDP neighbor relationship, wherein the second FP sends, after receiving the topology information of the first FP, the topology information of the first FP to the controller through a first control channel, wherein the first control channel is pre-established between the second FP and the controller;

a receiver configured to receive first routing information that is sent by the controller and is used by the first FP to reach the controller, wherein the first routing information is generated by the controller according to the topology information of the first FP;

a processor electrically connected to the transmitter and the receiver; and a non-transitory computer readable medium connected to the processor and having stored thereon instructions that, when executed, cause the processor to:

establish a second control channel with the controller according to the first routing information received by the receiver.

10. The first FP according to claim 9, wherein the virtual cluster system further comprises a third FP;

wherein a second LLDP neighbor relationship is established between the third FP and the first FP;

wherein the receiver is further configured to receive topology information of the third FP that is sent by the third FP by using the second LLDP neighbor relationship after the establishing the second control channel with the controller according to the first routing information;

wherein the transmitter is further configured to send topology information of the third FP that is received by the receiver to the controller through the second control channel, wherein the controller generates, according to the topology information of the third FP, second routing information that is used by the third FP to reach the controller;

wherein the receiver is further configured to receive, through the second control channel, the second routing information sent by the controller; and wherein the transmitter is further configured to send the second routing information received by the receiver to the third FP, wherein the third FP establishes a third control channel with the controller according to the second routing information.

11. The first FP according to claim 9, wherein the non-transitory computer readable medium further has stored thereon instructions that, when executed, cause the processor to:

establish a label switched path (LSP) with the controller according to the first routing information.

12. A controller, wherein the controller is applicable to a virtual cluster system, wherein the virtual cluster system comprises a first forwarding point (FP), a second FP, and the controller, and wherein a first Link Layer Discovery Protocol (LLDP) neighbor relationship is established between the first FP and the second FP, the controller comprising:

a receiver configured to receive topology information of the first FP that is sent by the second FP through a first control channel, wherein the topology information of the first FP is received by the second FP from the first FP by using the first LLDP neighbor relationship, and the first control channel is pre-established between the controller and the second FP;

a processor electrically connected to the receiver;

a non-transitory computer readable medium connected to the processor and having stored thereon instructions that, when executed, cause the processor to:

generate, according to the topology information of the first FP that is received by the receiver, first routing information that is used by the first FP to reach the controller; and a transmitter connected to the processor and configured to send the first routing information that is generated by the processor to the first FP through the second FP, wherein the first FP establishes, after receiving the first routing information, a second control channel with the controller according to the first routing information.

13. The controller according to claim 12, wherein the virtual cluster system further comprises a third FP;

wherein a second LLDP neighbor relationship is established between the third FP and the first FP; and wherein the receiver is further configured to receive topology information of the third FP that is sent by the first FP through the second control channel after the first FP establishes, after receiving the first routing information, the second control channel with the controller according to the first routing information;

wherein the topology information of the third FP is received by the first FP from the third FP by using the LLDP; and the first control channel is pre-established between the controller and the second FP;

wherein the non-transitory computer readable medium further has stored thereon instructions that, when executed, cause the processor to generate, according to the topology information of the third FP, second routing information that is used by the third FP to reach the controller; and wherein the transmitter further configured to send the second routing information to the third FP through the first FP, wherein the third FP establishes, after receiving the second routing information, the second control channel with the controller according to the second routing information.

* * * * *